United States Patent
Sakakibara et al.

(10) Patent No.: US 6,677,974 B2
(45) Date of Patent: Jan. 13, 2004

(54) LIGHT BEAM SCANNING APPARATUS WITH A MULTI-LAYER MIRROR STRUCTURE

(75) Inventors: Jun Sakakibara, Tokyo (JP); Koji Tanimoto, Kawasaki (JP); Kenichi Komiya, Kawasaki (JP); Koji Kawai, Fujisawa (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/813,287

(22) Filed: Mar. 21, 2001

(65) Prior Publication Data

US 2002/0135667 A1 Sep. 26, 2002

(51) Int. Cl.$^7$ ................................. B41J 2/435
(52) U.S. Cl. ........................ 347/250; 347/235
(58) Field of Search ................. 347/246, 247, 347/248, 250, 253, 235, 237

(56) References Cited

U.S. PATENT DOCUMENTS

| | | | | |
|---|---|---|---|---|
| 4,201,994 A | * | 5/1980 | Hoshito et al. | 347/234 |
| 5,570,195 A | * | 10/1996 | Honbo | 358/302 |
| 5,933,266 A | * | 8/1999 | Minakuchi | 359/196 |

FOREIGN PATENT DOCUMENTS

JP           63-8661 A   *  1/1988   ..........  G03G/15/01

* cited by examiner

Primary Examiner—Hai Pham
(74) Attorney, Agent, or Firm—Foley & Lardner

(57) ABSTRACT

A synchronization signal detector receives a laser beam each time it is scanned in a main scanning direction, and detects a synchronization signal from the received laser beam. An external circuit or the like sets a binary value-determining level for this detector. The binary value-determining level is so determined as not to generate a signal arising from stray light. By this determination, a synchronization error, which is due to stray light, is prevented without adding manufacturing steps to prevent the stray light or without incurring an increase in the cost needed for structural components.

3 Claims, 8 Drawing Sheets

LIGHT BEAM SCANNING APPARATUS WITH A MULTI-LAYER MIRROR STRUCTURE

BACKGROUND OF THE INVENTION

The present invention relates to a light beam scanning apparatus adapted for use in an image forming apparatus, such as a laser beam printer or a digital copying machine, wherein a beam emitted from a semiconductor laser is scanned across an image bearer to form a latent image on the image on the image bearer and wherein the latent image on the image bearer is printed on an image formation medium.

In an image forming apparatus that uses a laser beam for image formation, a laser beam (light output) emitted from a semiconductor laser is scanned across a photosensitive drum to form an electrostatic latent image thereon by employing a condenser lens, a rotatable polygonal mirror, a mirror, a correcting lens, etc. A synchronization signal, based on which a laser beam is scanned, is detected by a synchronization detecting circuit, which includes a light-receiving element such as a photodiode. A beam detected as the synchronization signal is reflected by a return mirror, which is not located in the optical path used when the scanning operation is performed with respect to the photosensitive drum. By that reflection, the beam is guided to the synchronization detecting circuit. Owing to this, the optical path of the beam used for the detection of a synchronization signal tends to be very complicated optically.

There is a demand for a small-sized image forming apparatus since the space it occupies should be as little as possible in offices. To meet this demand, the optical structure using a semiconductor laser tends to be further complicated. Under the circumstances, an image forming apparatus designed to execute image formation by use of a laser beam must employ a large number of optical elements arranged within a narrow space. In the optical system of the image forming apparatus, therefore, stray light, which is unnecessary reflected light, is inevitably produced.

If the stray light is incident on the synchronization detecting circuit, the synchronization for each scanning operation may be shifted. If the synchronization shift occurs, vertical lines may not be reproduced in an output image. To avoid this problem, factors that give rise to the stray light are removed by arranging optical components properly, determining a desirable position and angle of a reflecting surface, working the reflecting surface in such a manner that the reflected light becomes diffused light, or attaching a felt member or the like in such a manner as to decrease the reflectance. These measures, however, inevitably increase the number of manufacturing steps required, and the cost needed for the structural components.

Since the sensitivity of the photosensitive drum deteriorates with time, it may be necessary to gradually intensify the optical output of a semiconductor laser. In such a case, the intensity of stray light will increase in accordance with an increase in the intensity of an optical output of the semiconductor laser. If the stray light increases in intensity, it may give rise to a problem which does not occur in the initial state.

Furthermore, if the lens, mirror, glass or other members are stained, the optical efficiency may lower. If, in this case, the optical output intensity is constant, a reduced amount of optical energy will reach the synchronization detecting circuit. This may result in an undesirable operation of the synchronization detecting circuit and, in the worst case, failure to detect any synchronization signal.

BRIEF SUMMARY OF THE INVENTION

The present invention has been conceived in an effort to solve the problem that the number of manufacturing steps or the cost needed for structural components is increased when measures are taken to cope with stray light in the optical system of an image forming apparatus. An object of the present invention is therefore to provide a light beam scanning apparatus which does not result in an increase in the number of manufacturing steps or the cost needed for structural components, and yet prevents adverse effects stray light may have on the optical system of an image forming apparatus.

Another object of the present invention is to provide a light beam scanning apparatus capable of preventing adverse effects stray light may have on the optical system of an image forming apparatus, even when the optical output of a semiconductor laser is gradually intensified to compensate for deterioration the sensitivity of the photosensitive drum may undergo with time.

A further object of the present invention is to provide a light beam scanning apparatus capable of preventing adverse effects stray light may have on the optical system of an image forming apparatus, even if the lens, mirror, glass or other members are stained and the optical efficiency becomes lower.

A light beam scanning apparatus according to the present invention comprises: a light emitter for emitting a light beam to an image bearer on which a latent image is to be formed, the light beam being emitted in accordance with the latent image to be formed on the image bearer; an optical system for guiding the light beam emitted by the light emitter to the image bearer and for scanning the light beam in the main scanning direction of the image bearer one line at a time on the basis of a synchronization signal; and a synchronization signal detector for detecting a synchronization signal, the synchronization signal detector including a photoelectric conversion element that detects the light beam scanned by the optical system in units of one cycle and converts the detected light beam into an analog signal, the synchronization signal detector digitizing the analog signal obtained by the photoelectric conversion element on the basis of a reference signal supplied from an external circuit, so as to obtain a digital signal that serves as the synchronization signal.

An image forming apparatus according to the present invention comprises: an image bearer on which a latent image is formed by irradiation of a light beam; a light beam scanning apparatus for radiating a light beam to the image bearer on the basis of image information; a developing unit for developing the latent image the light beam scanning apparatus forms on the image bearer; a transfer section for transferring the image developed by the developing unit onto an image formation medium; and a controller for controlling the light beam scanning apparatus to form the latent image, controlling the developing unit to develop the latent image, and controlling the transfer section to transfer the developed image onto the image formation medium, the light beam scanning apparatus including: a light emitter for emitting a light beam to the image bearer on which a latent image is to be formed, the light beam being emitted in accordance with the latent image to be formed on the image bearer; an optical system for guiding the light beam emitted by the light emitter to the image bearer and for scanning the light beam in the main scanning direction of the image bearer one line at a time on the basis of a synchronization signal; and a synchronization signal detector for detecting a synchronization signal, the synchronization signal detector including a photoelectric conversion element that detects the light beam scanned by the optical system in units of one cycle and converts the detected light beam into an analog signal, the synchronization signal detector digitizing the analog signal obtained by the photoelectric conversion element on the basis of a reference signal supplied from an external circuit, so as to obtain a digital signal that serves as the synchronization signal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will now be described.

Figure 1:
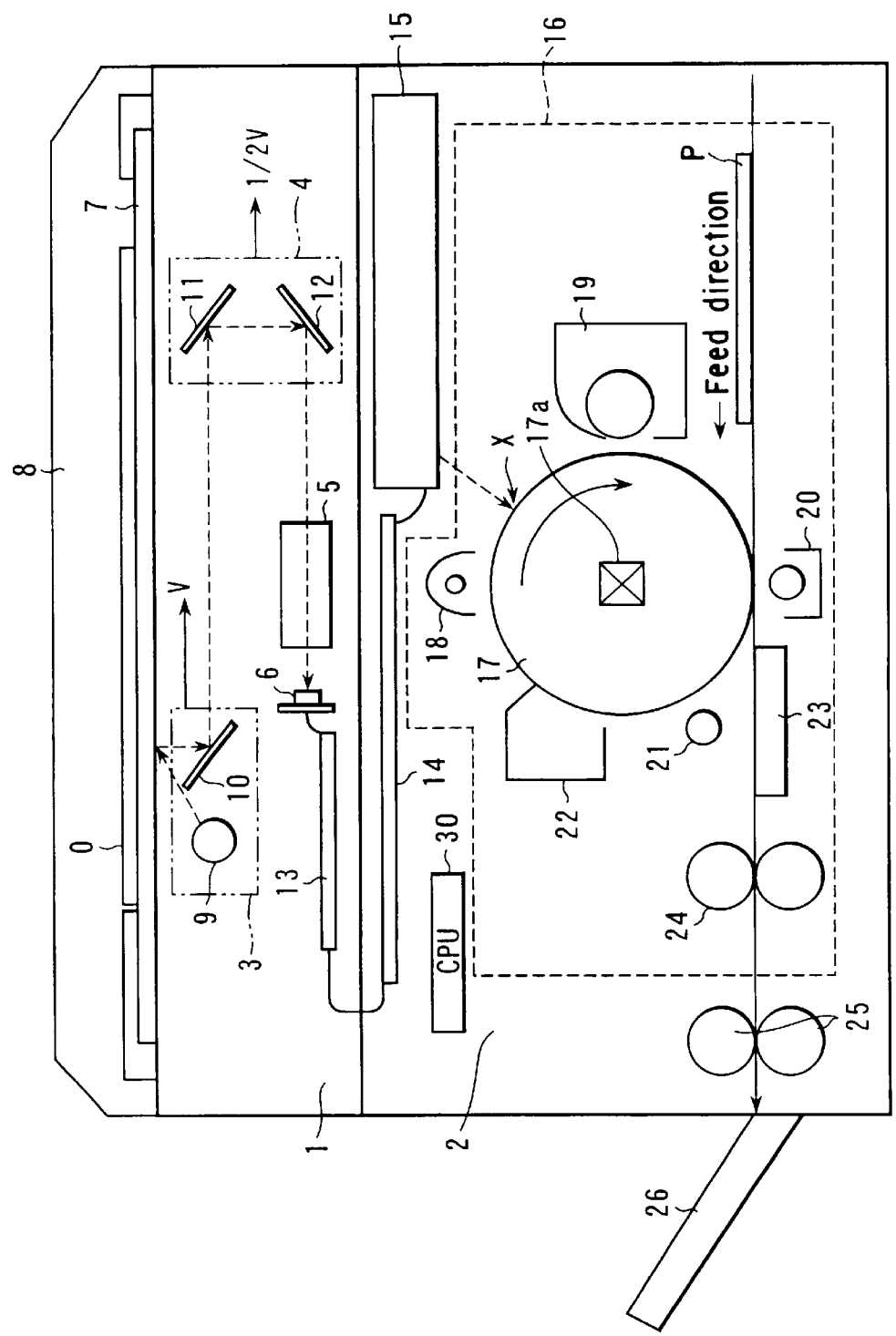
FIG. 1 is a schematic illustration of a digital copying machine.

FIG. 1 shows the structure of a digital copying machine, i.e., an image forming apparatus to which a light beam scanning apparatus (laser optical system unit) according to an embodiment of the present invention is applicable.

As shown in FIG. 1, the digital copying machine comprises a scanner section 1 and a printer section 2. The scanner section 1 reads an image from a document. The printer section 2 prints the image read by the scanner section 1 or an image supplied from an external device, on an image formation medium. The scanner section 1 and the printer section 2 are connected to a CPU 30. This CPU 30 controls the entire digital copying machine.

First, the scanner section 1 will be described.

As shown in FIG. 1, the scanner section 1 mainly includes a first carriage 3, a second carriage 4, a condenser lens 5, a CCD sensor (photoelectric conversion element) 6, a glass document table 7, a document fixing cover 8, a light source 9, mirror 10, mirror 11, mirror 12, and a CCD control board 13.

The first carriage 3 is provided with the light source 9 and the mirror 10. The second carriage is provided with mirrors 11 and 12. The first carriage 3 and the second carriage are moved from the right to the left by a carriage-driving motor (not shown). The moving speed of the first carriage 3 is twice as high as that of the second carriage 4. With this structure, the optical path from an original document O to the photoelectric conversion element 6 has a constant length.

The document O is placed on the glass document table 7, with its image side downward. The document fixing cover 8 can be opened or closed. When the document fixing cover 8 is closed, the document O is pressed against the glass surface of the glass document table 7. The light source emits light to the document O placed on the glass document table 7. The mirrors 10, 11 and 12 guide the reflected light from the document O to the condenser lens 5. The condenser lens 5 condenses the reflected light from the document in such a manner that the reflected light forms an image on the sensor surface of the CCD sensor 6.

The CCD sensor 6 converts the light incident on the sensor surface into electric signals. In other words, the CCD sensor outputs analog electric signals by conversion of the reflected light coming from the document O and condensed buy the condenser lens. The CCD control board 13 has a number of functions, including the function of converting the analog electric signals output from the CCD sensor into digital signals that represent halftone information on an image, the function of correcting a low-frequency distortion caused by the condenser lens 5, and the function of correcting a high-frequency distortion caused by the non-uniformity of the sensitivity of the CCD sensor 6 (e.g., shading correction).

The scanner section of the above structure operates in the manner described below.

First, the document O is placed on the glass document table 7, with its image side downward. When the document fixing cover 8, which is openable and closable, is closed, the document O is pressed against the glass document table 7. The document O on the glass document table 7 is irradiated with light emitted by the light source 9. The reflected light, which is the light coming from the light source 9 and reflected by the document O, passes via the mirrors 10, 11 and 12 and the lens 5, and is then focused on the sensor surface of the CCD sensor 6.

The illuminating light from the light source 9 is scanned across the document O when the first and second carriages 3 and 4 move. The reflected light from the document O, which is the light emitted from the light source 9 and reflected by the document O, is incident on the CCD sensor 6 in units of one line. The CCD sensor 6 sequentially converts the incident reflected light, which is the light coming from the document O, into analog electric signals in units of one line in accordance with the intensity of the light signal. The electric signals, which are analog electric signals obtained by conversion, are then converted into digital signals by the CCD control board 13. The digital signals represent halftone information on an image. The digital signals output from the CCD control board 13 are subjected to digital signal processing, such as the correction of shading (distortion). By this shading correction processing, a low-frequency distortion caused by the condenser lens 5, a high-frequency distortion caused by the non-uniformity of the sensitivity of the CCD sensor 6, or the like is corrected.

By performing the operation described above, the scanner section 1 reads the document placed on the glass document table 7 as digital image signals. The digital image signals corresponding to the read document are supplied from the scanner section 1 to the image processing board 14.

Next, the printer section 2 will be described.

As shown in FIG. 1, the printer section 2 mainly includes an image processing board 14, a laser optical system unit 15, and an image forming section 16. The image processing board 14 is connected to the CCD control board 13 of the scanner section 1. Digital image signals are supplied from the CCD control board 13 to the image processing board 14. The image processing board 14 executes various kinds of image processing, such as dithering and smoothing. The image information processed by the image processing board 14 are supplied to the laser optical system unit 15. The laser optical system unit 15 emits a laser beam on the basis of the image information and guides that laser beam to the photosensitive drum 17. The details of the structure of the optical system unit 15 will be described later.

The image forming section 16 includes a photosensitive drum 17, an electric charger 18, a developing unit 19, a transfer charger 20, a separation charger 21, a cleaner 22, a sheet feed mechanism 23, a fixing unit 24, a pair of discharge rollers 25 and a sheet discharge tray 26.

The photosensitive drum 17 is an image bearing member on which an electrostatic latent image is formed upon irradiation of the laser beam emitted from the laser optical system unit 15. The photosensitive drum 17 is provided with a counter 17a, and this counter counts the number of rotations the photosensitive drum 17 makes. The electric charger 18 electrically charges the surface of the photosensitive drum 17. The developing unit 19 develops the electrostatic latent image formed on the photosensitive drum 17 with a developer (toner). As a result, a toner image is formed. The transfer charger 20 transfers the toner image formed by the developing unit 19 onto a sheet. The separation charger 21 separates the sheet from the photosensitive drum 17. The cleaner 22 removes the residual toner from the photosensitive drum 17. The sheet feed mechanism 23 feeds sheets P one by one and conveys them to the discharge rollers 25. The fixing unit 24 fixes a toner image on a sheet. The discharge rollers 25 discharge a sheet P conveyed by the sheet feed mechanism 23 onto the sheet discharge tray 25.

The printer section 2 having the above structure will be described below.

The photosensitive drum 17 is rotated by a driving motor (not shown) in such a manner that its outer peripheral speed is a predetermined value. When the photosensitive drum 17 is rotated, its surface is electrically charged by the electrical charger 18, which is arranged opposite the photosensitive drum 17. On the surface of the photosensitive drum 17 charged by the electric charger 18, an electrostatic latent image is formed with a laser beam transmitted from the laser optical system unit 15. For example, when exposure position X on the charged photosensitive drum 17 is irradiated with the laser beam, the potential at exposure position X lowers. In other words, the surface of the photosensitive drum 17 is partly exposed to the laser beam, and the surface portions where the potential lowers form an image (i.e., an electrostatic latent image). The developing unit 19 supplies toner (developer) to the photosensitive drum 17 on which the electrostatic latent image is formed. As a result, a toner image is formed on the photosensitive drum 17.

Sheets P, which are image formation mediums, are fed by a sheet feeder (not shown). The sheet feeder separates one sheet from a stack of sheets located inside a sheet feed cassette in the bottom region of the distal copying machine. The sheet P separated from the other sheets is conveyed to register rollers (not shown) and is made to stand by until predetermined timing. When the predetermined timing comes, the sheet P at the register rollers is supplied to a transfer position.

When the sheet P reaches the transfer position, the transfer charger 20 transfers the toner image thereto from the photosensitive drum 17. At positions downstream of the transfer charger 20, the sheet feed mechanism 23, the fixing unit 24 and the sheet discharge rollers 25 are arranged. The sheet P onto which the toner image is transferred is conveyed to the fixing unit 24, by which the toner image is fixed, and then to the discharge rollers, by which the sheet P is discharged onto the sheet discharge tray 26.

After the toner image is transferred onto the sheet P, the residual toner is removed from the surface of the photosensitive drum 17 by the cleaner 22. As a result, the surface of the photosensitive drum 17 is set in the initial state, and the photosensitive drum 17 becomes ready for the next image formation. By repeating this process, the image forming operation is performed in succession.

The first, second and third examples of the laser optical system unit 15 will be described.

Figure 2:
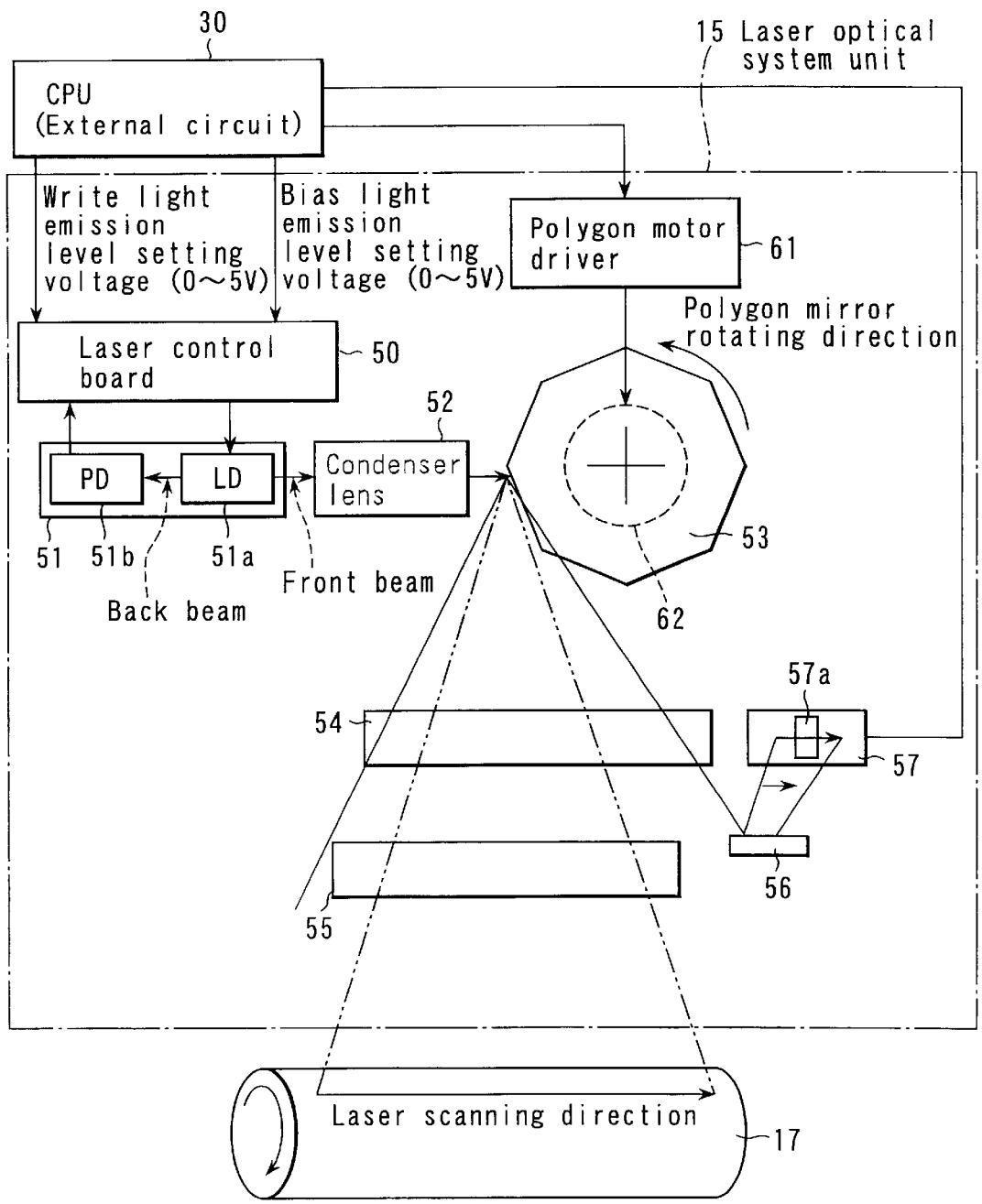
FIG. 2 shows a first structural example of a laser optical system unit.

FIG. 2 shows the first example of the laser optical system unit 15A. The first example of laser optical system unit 15A will be described with reference to FIG. 2.

As shown in FIG. 2, the laser optical system unit 15A comprises a laser control board 50, a semiconductor laser 51, a condenser lens 52, a polygon mirror 53, Fθ lens 54, a first return mirror 55, a second return mirror 56, a synchronization signal detector, or the like. The synchronization signal detection section includes a synchronization signal detecting circuit 57 which has a photodiode 57a serving as a light-receiving element.

The semiconductor laser 51 includes a laser diode (LD) 51a and a photodiode (PD) 51b. The laser diode 51a is a light-emitting element that emits a laser beam. The photodiode 51b is a light-receiving element that converts the laser beam into an electric signal representing the amount of light.

The laser control board 50 supplies a current to the laser diode 51a, i.e., the light-emitting element of the semiconductor laser 51, causing the laser diode 51a to emit a laser beam. When the laser diode 51a emits the laser beam, the photodiode 51b receives the laser beam emitted by the laser diode 51a. Upon reception of the laser beam, the photodiode 51b converts it into an electric signal corresponding to the intensity (light amount) of it. The electric signal output from the photodiode 51b is supplied to the laser control board 50. In this manner, the laser control board 50 senses electrically senses the light emission state of the laser diode 51a.

In the above, reference was made to the case where the laser diode 51a and the photodiode 51b, which constitute the semiconductor laser 51, are physically arranged in a single device. Instead of this, the laser diode 51a and the photodiode 51b may be located at different positions as long as they fulfill the functions required of them.

The optical output intensity in the mode in which an image is being formed and the optical output intensity in the mode in which no image is being formed are controlled by a processing circuit (e.g., CPU 30) located outside of the laser optical system unit.

A front beam emitted from the laser diode 51a passes through the condenser lens 52 and is reflected by the polygon mirror 53, which is a rotatable multi-face mirror. The polygon mirror 53 is rotated at a constant speed by a polygon motor 62, which in turn is driven by a polygon motor driver 61. The driving of the polygon mirror 35 is controlled on the basis of a synchronization signal HSYNC (a horizontal synchronization signal). The reflected light from the polygon mirror 53 passes via the Fθ lens 54, is reflected by the first return mirror 55, and is then incident on the exposure position X of the photosensitive drum 17, i.e. the image bearer. An electrostatic latent image is formed at the exposure position X of the photosensitive drum 17 to which the light is incident. Part of the laser beam passes via the Fθ lens 54, is reflected by the second return mirror 56, and is then incident on the synchronization signal detector 57, which controls the synchronization of each scan. The synchronization signal detector 57 generates synchronization signal HSYNC, which is used for controlling the scanning speed of the photosensitive drum 17.

Figure 3:
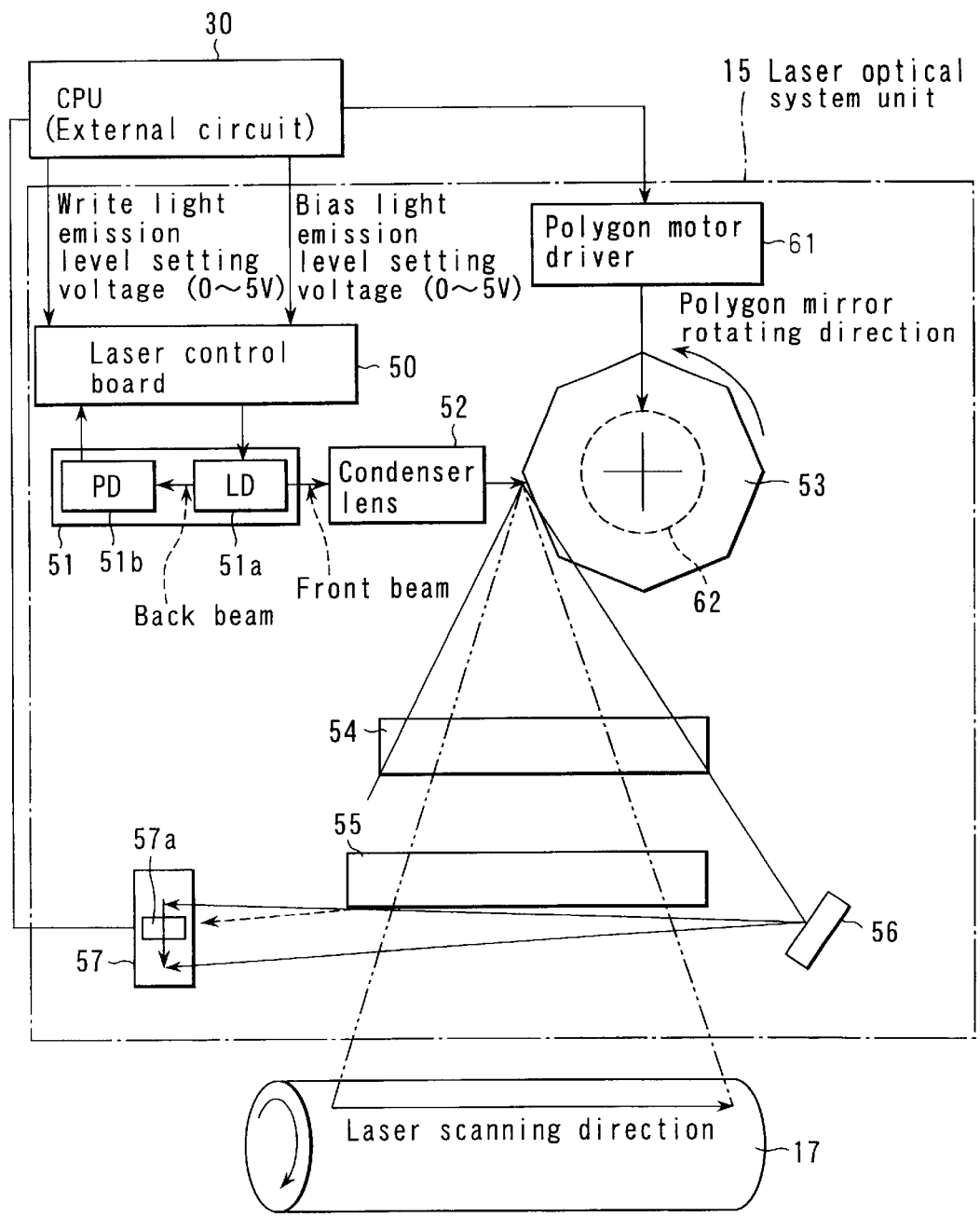
FIG. 3 shows a second structural example of a laser optical system unit.

FIG. 3 is a schematic illustration showing the second example of the laser optical unit 15.

The laser optical system unit 15B of the second example shown in FIG. 3 is similar in function to the laser optical system unit 15A shown in FIG. 2. The former differs from the latter in light of the manner in which the second return mirror 56 and the synchronization signal detector 57 are arranged. This arrangement is intended for enabling shape alteration or unit size reduction. The laser optical system unit 15B of the second example shown in FIG. 3 will be described.

The laser optical system unit 15B shown in FIG. 3 differs from that 15A shown in FIG. 2 in that the reflected light from the second return mirror 56 passes through the region under the first return mirror 55 and is then incident on the synchronization signal detector 57. Except for the angle of the second return mirror 56 and the arrangement of the synchronization signal detector 57, the structure shown in FIG. 3 is similar to that shown in FIG. 2, and reference to the similar-feature portions of the structure will be omitted.

The structure in FIG. 3 is adopted where the laser optical system unit must be small in size or is restricted in shape, and the synchronization signal detector 57 cannot therefore be arranged at the position shown in FIG. 2.

In the laser optical system unit 15B of the second example shown in FIG. 3, there may be a case where the tip end of the first return mirror 55 is inserted in the optical path of the reflected light from the second return mirror 56. In such a case, part of the reflected light from the second return mirror 56 is reflected at the tip end of the first return mirror 55, and the stray light generated thereby may be incident on the synchronization signal detecting sensor 57.

The laser optical system unit 15C of the third example shown in FIG. 4 will be described.

Figure 4:
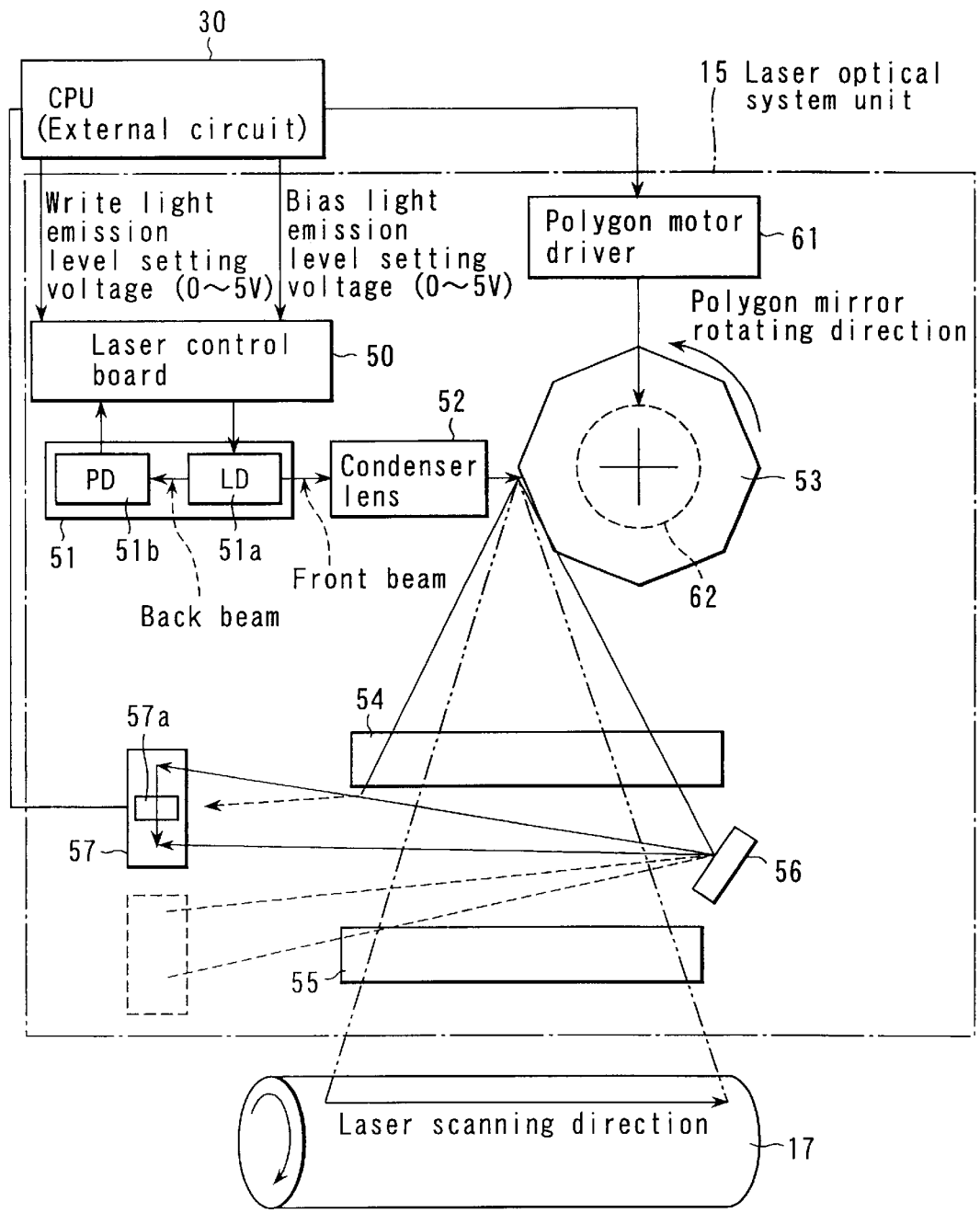
FIG. 4 shows a third structural example of a laser optical system unit.

The laser optical system unit 15C shown in FIG. 4 differs from that 15A shown in FIG. 2 in that the reflected light from the second return mirror 56 passes across the optical path connecting between the Fθ lens 54 and the first return mirror 55 and is then incident on the synchronization signal detector 57. Except for the angle of the second return mirror 56 and the arrangement of the synchronization signal detector 57, the structure shown in FIG. 4 is similar to that shown in FIG. 2, and reference to the similar-feature portions of the structure will be omitted.

The laser optical system unit 15C of the third example shown in FIG. 4 is adopted in a similar case to that of the system shown in FIG. 3; it is adopted where the laser optical system unit must be small in size or is restricted in shape, and the synchronization signal detector 57 cannot therefore be arranged at the position shown in FIG. 2.

In the laser optical system unit 15C shown in FIG. 4, there may be a case where the tip end of the Fθ lens 54 or the tip end of the first return mirror 55 is inserted in the optical path of the reflected light from the second return mirror 56. In such a case, part of the reflected light from the second return mirror 56 is reflected at the tip end of the Fθ lens 54 or the tip end of the first return mirror 55, and the stray light may be generated thereby.

As described above, the optical system of the laser optical system unit shown in FIG. 3 or 4 is inevitably complex. In such a complex optical system, stray light may be easily produced, depending upon the configuration of the structural components of the laser optical system unit or the accuracy at which the components are fixed.

In accordance with the recent trend toward less-space offices, digital copying machines must be as small as possible, and the small-sized digital copying machines require small-sized laser optical system units. In a small-sized laser optical system unit, structural components must be arranged within a narrow space, and the structure shown in FIG. 3 or FIG. 4 may have to be adopted. In such a case, the laser optical system unit requires very high precision when the structural components are attached.

The stray light which may be generated in a laser optical system unit will be described.

Figure 5:
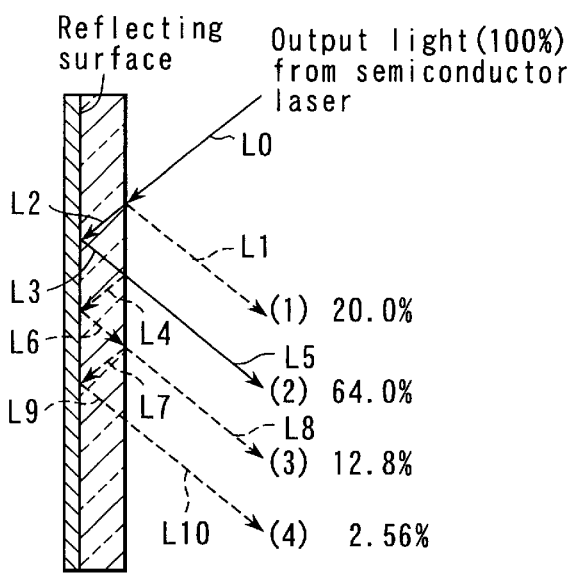
FIG. 5 illustrates an example of a manner in which a mirror reflects light beams.

FIGS. 5, 6, 7 and 8 illustrate why stray light is generated when a mirror reflects light. In general, as shown in FIG. 5, a mirror is made up of a reflecting film serving as a reflecting surface, and a glass member for protecting the reflection film from damage when an external force is applied thereto. For example, when the laser beam L0 from the semiconductor laser is guided to a mirror, it is divided into two components: one is component L1 reflected by the surface of the glass member; and the other is component L2 passing through the glass member and reaching the reflecting surface. For the sake of simplicity, let us assume that 20% of light L0 becomes component L1 reflected by the glass surface and 80% of light L0 becomes component L2 passing through the glass member and reaching the reflecting surface.

Although light L2 transmitted through the glass member is reflected by the reflecting surface, it is not reflected 100% in actuality. In other words, diffused light is generated, and the efficiency of reflection is degraded. For simplicity, let us assume that no diffused light is generated and the reflection factor at the reflecting surface is 100%. In the case where the reflection factor is 100%, the reflected light L3 reflected by the reflecting surface accounts for 80% of illuminating (incident) light L0.

When reflected light L3 is output from within the glass member into the atmosphere, it undergoes transmission and reflection at the glass member as in the case where it is incident on the glass member from the atmosphere. Let us assume that the transmission factor of the light traveling from the glass member to the atmosphere is 80% and that the efficiency of the light reflected by the glass member and returning to the reflecting surface is 20%. In this case, reflected light L3 at the reflecting surface is divided into two components: one is component L4 reflected by the glass member, and the other is component L5 passing through the glass member. Since component L5 passing through the glass member is 80% of reflected light L3, it accounts for 64% of incident light L0.

In this manner, the efficiency at which incident light L0 returns into the atmosphere is 64%.

Light L4 directed again to the reflecting surface is 20% of light L3. This light, L4, is reflected by the reflecting surface. At the time, reflected light L6 is divided into component L7 reflected by the glass surface and component L8 transmitted through the glass plate. It should be noted that L4, L6, L7 and L8 behave in a similar manner to that of L2, L3, L4 and L5. That is, component L8, which is reflected light L3 of L2 and which is reflected by the glass surface and output again into the atmosphere, accounts for 12.8% of L0. Component L7, which is part of light L6 and directed to the reflecting surface, is reflected by the glass surface. Part of this reflected light is output into the atmosphere again, and this component accounts for 2.56% of L0.

Figure 6:
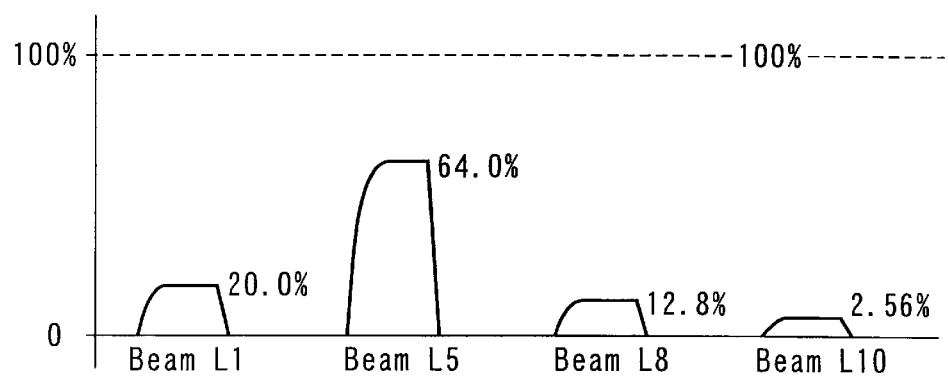
FIG. 6 shows waves illustrating the optical energy which the light beams reflected by the mirror have.
Figure 7:
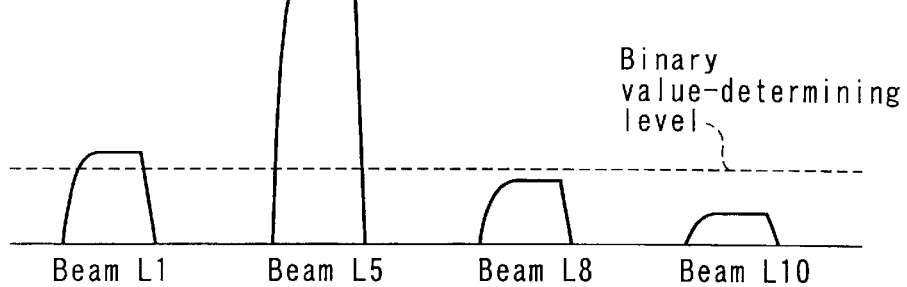
FIG. 7 shows waves of analog electric signals that are obtained by conversion of the optical energy waves shown in FIG. 6.
Figure 8:
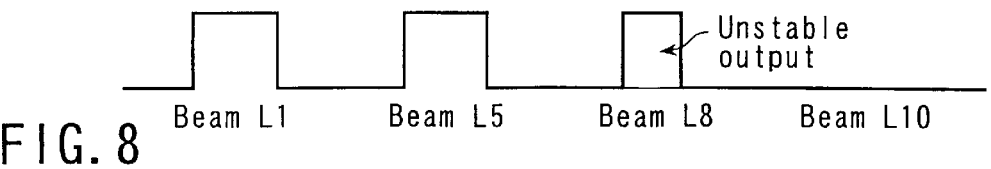
FIG. 8 shows waves obtained when the analog electric signals are digitized.

FIG. 6 shows waveforms specifically illustrating the light beams shown in FIG. 5, namely, reflected light beam L1 from the glass surface and transmitted light beams L5, L8 and L10 from the glass surface. FIG. 7 shows how the waves shown in FIG. 6 are converted into analog electric signals. FIG. 8 shows how analog electric signals described as waves are converted into digital signals.

Irradiated with light beams having such waveforms as shown in FIG. 6, a photodiode outputs analog electric signals whose waveforms are shown in FIG. 7. When the binary value-determining level indicated by the broken line in FIG. 7 is used, digital signals corresponding to beams L1 and L5 are generated. In the example shown in FIG. 7, the value of the analog electric signal corresponding to beam L8 is close to the binary value-determining level. It is therefore likely that the digital signal corresponding to beam L8 will be generated. Even when only a digital signal corresponding to beam L5 (i.e., the primary reflected beam from the mirror) is desired, the digital signal actually generated may correspond to another beam. In other words, the digital signal actually generated corresponds to a reflected beam (beam L1 or beam L8), which is stray light generated at the interface between the glass surface and the atmosphere.

The phenomenon described above is considered the cause of stray light being generated by a mirror. To cope with this phenomenon, it may be through to set a high binary value-determining level since this prevents generation of a signal corresponding to stray light. In the laser optical system unit 15, however, the mirrors, including the polygon mirror 53 and the second return mirror 56, may be stained with time, deteriorating the reflection factor. Likewise, the condenser lens 52 or the Fθ lens 54 may be stained with time, deteriorating the transmission factor. If the optical components of the laser optical system unit 15 are stained with time, and the optical efficiencies are deteriorated thereby, a high binary value-determining level is undesirable because even a signal corresponding to target light may not be obtained.

As described above, the reflection and transmission factors of the optical components (e.g., mirrors and lenses) of the laser optical system unit 15 may deteriorate with time. If the optical efficiencies deteriorate, the amount of reflected light falling on the synchronization signal detecting sensor 57 may become significantly smaller than the amount of reflected light in the initial state. As can be seen from this, if the binary value-determining level is set so high in the initial state as not to generate a signal corresponding to stray light, a signal that can be detected in the initial state may not be detected after the elapse of a predetermined period, due to the efficiency deterioration taking place with time.

A description will be given of the case where stray light is generated in the photodiode 57a.

Figure 9:
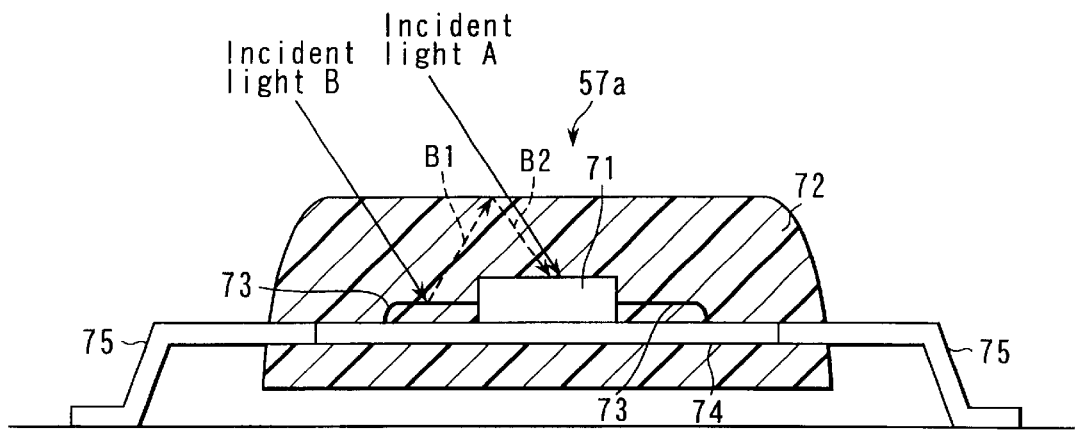
FIG. 9 illustrates how stray light is generated in a photodiode having a light-receiving element.

FIG. 9 illustrates why stray light is generated inside the photodiode 57a. FIG. 9 is a sectional view showing an internal structure of the photodiode 57a.

As shown in FIG. 9, the light-receiving element 71 of the photodiode 57a is covered with a plastic mold 72. Inside the photodiode 57a, the light-receiving element 71 is arranged on the plate 74. The light-receiving element 71 plate 71 is connected by means of a wire 73, which is a conductor.

A lead 75 is connected to the plate 74. In the description below, reference will be made to the case where external light is incident on the photodiode 57a of the structure shown in FIG. 9. In principle, the light-receiving element 71 converts incident light A into an electric signal, but does not operate in response to incident light B.

However, incident light B may be reflected by the wire 73, which connects the light-receiving element 71 and the plate 74, or by the plate 74 itself. Such reflected light B1 may be reflected again by the surface of the plastic mold 72 (as indicated by the broken lines in the Figure), causing the light-receiving element 71 to react. In this manner, stray light may be generated inside the photodiode 57a.

As described above, there are various causes of stray light, and such causes cannot be easily eliminated from the viewpoint of structure.

A structural example of the synchronization signal detector 57 and an example of a manner in which the binary value-determining level is set will be described.

Figure 10:
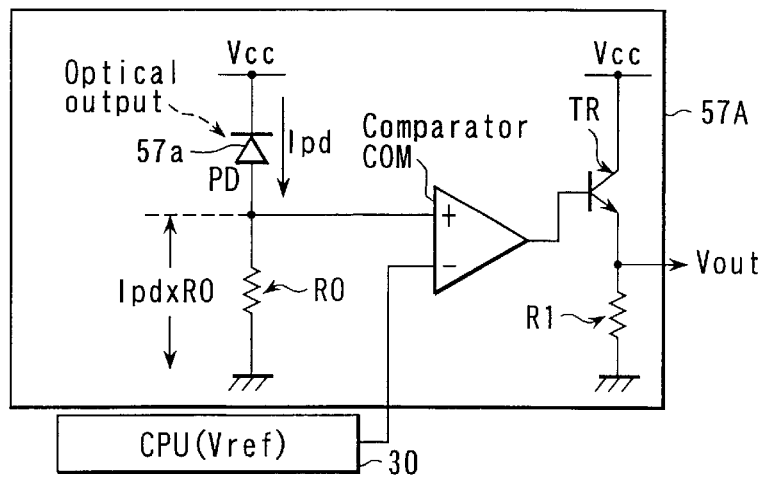
FIG. 10 shows a structural example (first structural example) of a synchronization signal detector designed in such a manner that the binary value-determining level is controlled externally.

FIG. 10 shows the first example of the synchronization signal detector 57A. As shown in FIG. 10, the synchronization signal detector 57A is a circuit made up of a photodiode (PD) 57a, a fixed resistor element R0, a comparator COM, a transistor TR and another fixed resistor element R1.

The photodiode 57a has such a structure as shown in FIG. 9. The fixed resistor element R0 converts a current, which is supplied from the photodiode 57a, into a voltage. The comparator COM is made of an operational amplifier. The inverted input terminal of the comparator COM is supplied with a setting signal from CPU 30, which is an external circuit. The transistor TR is connected to the output terminal of the comparator. The fixed resistor element R1 converts an emitter current of the transistor TR into a voltage.

The setting signal supplied to the inverted input terminal of the comparator COM is a signal representing a binary value-determining level (Vref). In other words, the synchronization signal detector 57A shown in FIG. 10 sets the synchronization determination level (Vref) in response to an external circuit, such as CPU 30.

In the synchronization detector 57A of the above structure, the photodiode 57a is applied with a reverse bias. If the photodiode 57a is irradiated with light in this state, a sensing current Ipd, which is determined in accordance with the optical energy, flows from the cathode terminal of the photodiode 57a to the anode terminal. The comparator COM is made of an operational amplifier. It follows from this that the non-inverted input terminal of the comparator COM is very high in input impedance. Therefore, the sensing current Ipd does not flow to the non-inverted input terminal of the comparator COM; it flows to the fixed resistor element. Hence, a sensing voltage value (Ipd×R0) appears in the non-inverted terminal of the comparator COM.

Figure 11:
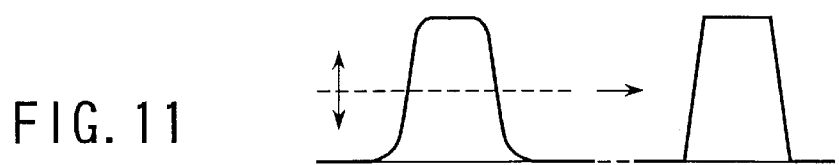
FIG. 11 is a waveform chart illustrating how the binary value-determining level is compared with sensed voltages.

The comparator COM compares the binary value-determining level Vref, which is a fixed value applied to the inverted input terminal, with the sensing voltage (Ipd×R0) described above. FIG. 11 is a waveform chart in which the binary value-determining level Vref and the sensing voltage (Ipd×R0) are compared in their output states. In FIG. 11, the broken line indicates the binary value-determining level.

When the comparison result is (Ipd×R0)≦Vref, the output of the comparator COM is "0", which is an electric reference potential. When the output of the comparator COM is "0", the base terminal of transistor TR succeeding to the comparator COM does not generate a voltage, and transistor TR is in the OFF state. In the OFF state, no current flows between the collector and emitter of the transistor, and no voltage appears at "Vout".

On the other hand, when the comparison result is (Ipd× R0)>Vref, the output of the comparator COM is Vcc, which is a power supply voltage. When the output of the comparator COM is "Vcc", transistor TR is in the ON state. In the ON state, a current flows between the collector and emitter of transistor TR, and a voltage of about −0.7V (i.e. the base terminal voltage of transistor TR) appears at "Vout". The base terminal voltage Vout of this transistor TR is a synchronization signal.

With the above structure, the threshold value (binary value-determining level) based on which the light incident on the light-receiving element is converted into digital signals can be controlled by an external circuit. Hence, only desired light can be converted into digital signals, and the rest of the light, i.e. stray light, is not converted into digital signals.

A description will now be given of an example of a manner in which the binary value-determining level of the synchronization signal determining section 57A is set.

For example, when the binary value-determining level Vref is set to be low, the value of (Ipd×R0) can be small. In other words, the sensing current Ipd can be a weak current. Even in this case, the synchronization signal determining section 57A can output a synchronization signal as long as the aforesaid relation (Ipd×R0) is satisfied. At the same time, however, even a weak light output results in a synchronization signal being output, so that the stray light may be easily detected as a synchronization signal.

Conversely, when the binary value-determining level Vref is set to be high, the synchronization signal determining section 57A does not output a synchronization signal if the sensing current Ipd is a weak current. As a result, a synchronization signal that does not respond to stray light can be detected.

If the binary value-determining level Vref is set to be too high, a decrease in the optical efficiency may result in failure to detect a synchronization signal based on a normal light output. Therefore, a binary value-determining level is set for the synchronization signal detector 57A of the structure in FIG. 10, with the above phenomenon being taken into account. In the description below, a specific example of a manner in which a plurality of binary value-determining levels are set will be described.

First of all, the first setting example of the binary value-determining level of the synchronization signal detector 57A will be described. According to the first setting example, a binary value-determining level is set to be comparatively high and is adjusted in accordance with a decrease in optical efficiencies (reflection and transmission factors).

In general, the optical members of the laser optical system unit employed in a digital copying machine are designed in such a manner that the optical efficiencies do not deteriorate with time. However, if the digital copying machine is used in a dusty environment, the optical efficiencies of the optical members will deteriorate markedly. If this deterioration in the optical efficiencies is considered likely, the setting of the binary value-determining level described below will be effective.

The first setting example is determined in anticipation of the situation where the optical efficiencies of the optical members of the laser optical system unit 15 deteriorate with time. Since, in this case, the optical efficiency deterioration due to stain does not become a problem in the initial state, the optical output energy incident on the photodiode 57a of the synchronization signal detector 57A is large in amount. In the initial state, therefore, the binary value-determining level Vref is set to be comparatively high. This setting reliably differentiates a normal signal from stray light.

The optical efficiencies of the optical members gradually deteriorate with time. In accordance therewith, the amount of optical output energy incident on the photodiode 57a of the synchronization signal detector 57A will gradually decrease. In accordance with this phenomenon, wherein the optical efficiencies gradually deteriorate and the amount of light energy incident on the light-receiving element decreases, the binary value-determining level is lowered. By doing so, the synchronization signal corresponding to the laser beam that is scanned across the photosensitive drum can be detected reliably.

Next, the second setting example of the binary value-determining level of the synchronization signal detector 57A will be described. According to the second setting example, the binary value-determining level is set in anticipation of the situation wherein the optical efficiencies decrease in accordance with the number of times an image forming operation is executed.

In general, in an image forming apparatus, such as a digital copying machine, the optical efficiencies of the laser optical system unit 15 are considered to deteriorate in proportion to the number of times an image forming operation is executed. According to the second setting example, therefore, the binary value-determining level is set or adjusted in accordance with the number of rotations the photosensitive drum 17 makes.

In this case, the photosensitive drum 17 is provided with a drum counter 17a for counting up the number of rotations, and the binary value-determining level Vref is set in accordance with the count of the drum counter 17a. The binary value-determining level Vref is set, for example, in such a manner as to lower the binary value-determining level Vref in accordance with the count of the drum counter 17a. By doing so, the binary value-determining level Vref can be set in accordance with a decrease the optical efficiencies may suffer in proportion to the number of rotations the photosensitive drum 17 makes, i.e. the number of times the image forming operation is executed.

Next, the third setting example of the binary value-determining level of the synchronization signal detector 57A will be described. According to the third setting example, the binary value-determining level is set in accordance with a decrease the sensitivity of the photosensitive drum 17 may suffer.

In general, the photosensitive drum 17 of a digital copying machine deteriorates in sensitivity with time. In other words, the variation the surface potential of the photosensitive drum 17 shows in response to the amount of irradiation light deteriorates with the elapse of time. This deterioration in the sensitivity of the photosensitive drum 17 is partly attributable to the surface being cleaned with the cleaner 22. The cleaner 22 is a member for removing residual toner from the surface of the photosensitive drum 17. When the surface is cleaned with the cleaner 22, it may rub off, resulting in the deterioration of the sensitivity.

In general, the image forming apparatus, such as the digital copying machine, outputs high-density images in the initial state, and the density of output images gradually lowers with time. To avoid this phenomenon, the image density decrease the image forming apparatus undergoes with time may be compensated for by intensifying the optical output of the semiconductor laser 151 in accordance with the elapse of time, thereby stabilizing the image density. By taking this measure, the sensitivity deterioration the photosensitive drum 17 may suffer can be compensated for.

However, a decrease in the optical efficiency is dependent on the environment in which the digital copying machine is used. It is therefore hard to think that the sensitivity of the photosensitive drum 17 and the optical efficiency decrease at similar rates. Assuming that the optical efficiency does not deteriorate with time, an increase in the intensity of the optical output of the semiconductor laser 51 results in the phenomenon wherein the optical energy incident on the photodiode 57a increases with time. If the binary value-determining level Vref is constant, stray light, which does not become a problem in the initial state, gradually increases in intensity and may be detected as a signal eventually.

To solve this problem, the third setting example determines the binary value-determining level in accordance with the intensity of an optical output of the semiconductor laser 51, which optical output is increased in accordance with the sensitivity deterioration the photosensitive drum 17 may undergo. The third setting example will be specifically described.

Where the optical intensity of the semiconductor laser is gradually increased in accordance with the sensitivity deterioration the photosensitive drum 17 may undergo, the binary value-determining level Vref should not be constant. If this level is constant, the problem described above will occur. The binary value-determining level Vref should be gradually increased in accordance with an increase in the intensity of the optical output of the semiconductor laser 51.

By this processing, reliable synchronous detection is enables at all times even if the amount of light energy incident on the photodiode 57a gradually increases with time. The intensity of an optical output from the semiconductor laser 51 can be controlled by a processing circuit, such as CPU 30. At the time of intensity control, CPU 30 can also control the binary value-determining level Vref of the synchronization signal detector 57A.

As described above, the binary value-determining level Vref is set and determined by a CPU or the like, which is provided externally of the synchronization signal detector 57A. With this feature, the determination of the binary value-determining level Vref is flexible and can be made in accordance with the condition of the image forming operation. Hence, the image forming apparatus can determine the binary value-determining level Vref in various ways, for example, with time, in response to each scan operation, in response to the depression of a copy button, in response to the operation of turning on the apparatus, etc.

Next, a description will be given of the second example of a synchronization signal detector 57B.

Figure 12:
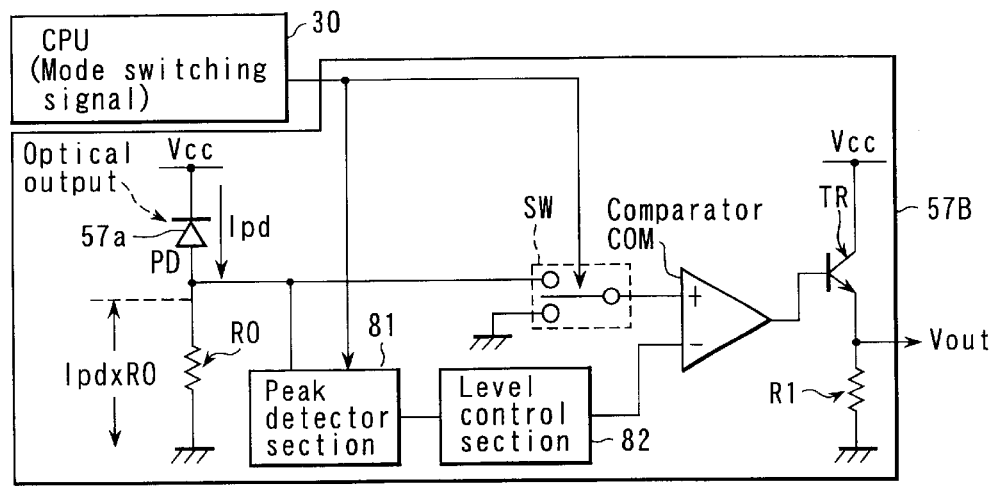
FIG. 12 shows a structural example (second structural example) of a synchronization signal detector which has a peak detecting function and which controls the binary value-determining level.

FIG. 12 shows a circuit diagram illustrating the second structural example of the synchronization signal detector 57B.

The synchronization second detector 57B comprises a photodiode 57a, a fixed resistor element R0, a peak detector section 81, a level control section (processing circuit) 82, a switch SW, a comparator COM, a transistor TR, and another fixed resistor element R1.

The photodiode 57a is a light-receiving element used for converting light into an analog light sensing current Ipd. The fixed resistor element R0 converts the light sensing current Ipd supplied from the photodiode 57a into voltage. The peak detector section 81 holds a maximum value of the voltage signal obtained by the fixed resistor element R0. The level control section 82 converts the voltage signal held by the peak detector section 81 into an adequate binary value-determining level used in the comparator COM. The switch SW allows the voltage signal, which corresponds to the sensing signal from the photodiode 57a, to be supplied to either the peak detector section or the inverted input terminal of the comparator COM. The switch SW is switched over between the two in response to a mode switching signal (driving signal) supplied from the CPU 30 (external circuit), which is an external circuit. The comparator COM is made of an operational amplifier that compares a voltage signal, which corresponds to the sensing signal from the photodiode 57a, with a binary value-determining level signal generated by the level control section 82. The transistor TR is located on the output side of the comparator COM.

Figure 13:
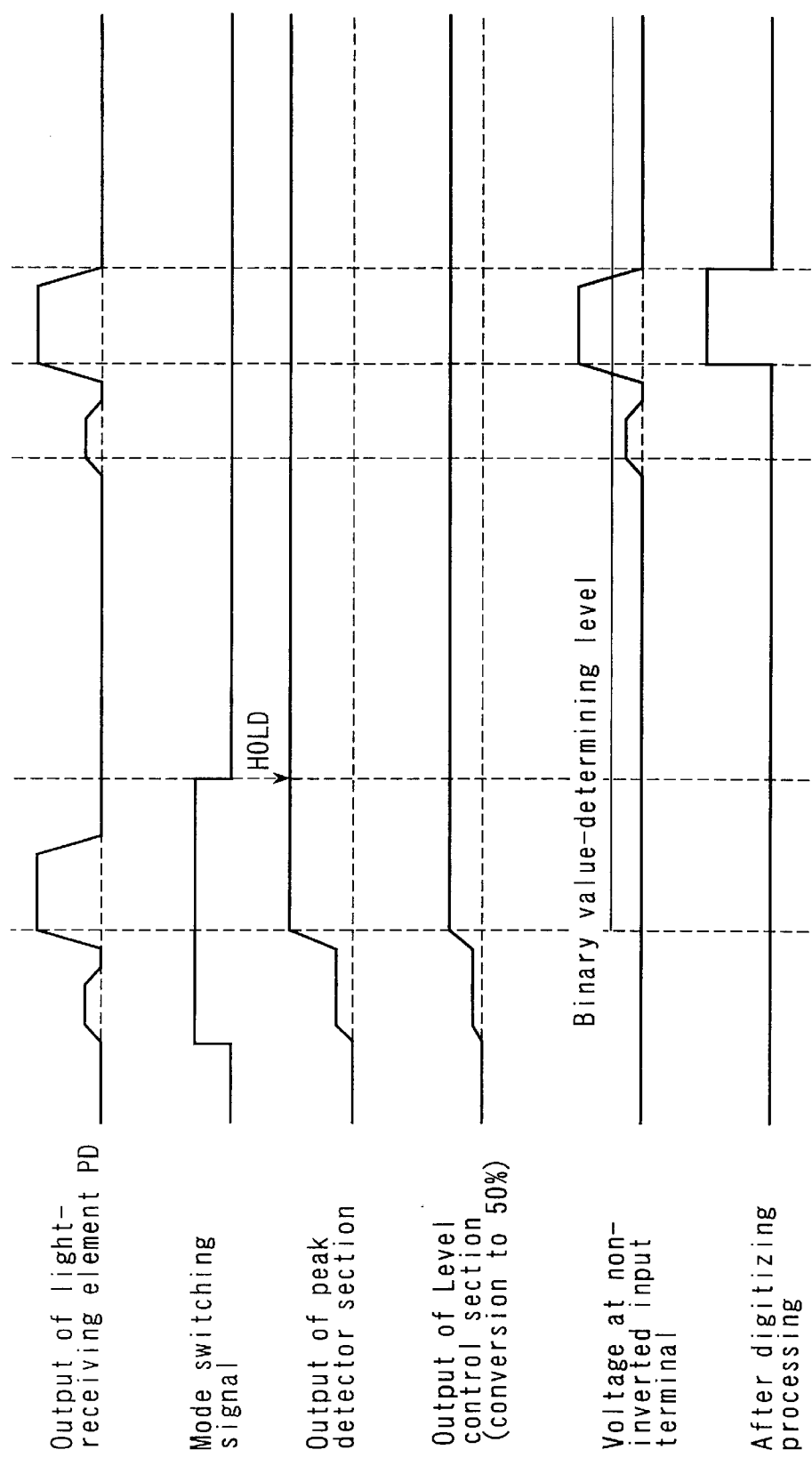
FIG. 13 is a timing chart illustrating how the synchronization signal detector of the configuration depicted in FIG. 12 operates.

FIG. 13 is a timing chart illustrating the operation of the synchronization signal detector 57B shown in FIG. 12. The operation of the synchronization signal detector 57B in FIG. 12 will be described with reference to FIG. 13.

Let us assume that either "H" or "L" is supplied from the CPU 30 to the synchronization signal detector 57B as a mode switching signal (driving signal). When the mode switching signal is "H" (which selects a mode for setting a binary value-determining level), the switch SW switches over to the lower position. When the mode switching signal is "L", the switch SW switches over to the upper position. Since the switch SW switches over to the lower position in response to "H" being supplied to the synchronization signal detector 57B as a mode switching signal, the non-inverted input terminal of the comparator COM is fixed at the reference potential level. The mode switching signal is also used as an enable signal of the peak detector section 81. When in this state the light-receiving element PD is irradiated with the light output from the semiconductor laser 51, a sensing current Ipd is output from that the light-receiving element PD.

FIG. 13 illustrates the case where a signal caused by stray light precedes a desired signal. The peak detector 81 first holds a maximum value of the amplitude of the signal caused by stray light. The following desired signal is greater in amplitude than the preceding "stray light" signal. Thus, the peak detector 81 serves to maintain the maximum amplitude of the succeeding desired signal.

The amplitude held by the peak detector 81 is converted into a signal having a level that is suitable for use as the binary value-determining level of the level control section 82. The description will be given based on the assumption that the level is "50%". When the amplitude of the desired signal is held, the CPU 30 changes the mode switching signal to "L". As a result, the peak detection section 81 stops operating, and the switch SW is connected to the upper position.

In the above manner, the voltage obtained by conversion of the sensing current from the light-receiving element PD is applied to the non-inverted input terminal of the comparator COM. On the other hand, the inverted terminal of the comparator COM is applied with a voltage which is detected by the peak detector 81 and the signal amplitude of which is cut to 50% by the level control section 82. The comparator COM compares the voltage applied to the non-inverted input terminal with that applied to the inverted input terminal. Based on this comparison, the synchronization signal detecting circuit 57B can detect only the desired signal; it does not detect the signal caused by stray light.

As described above, the synchronization signal detector 57B of the second structural example does not employ an external circuit to set a binary value-determining level. The binary value-determining level can be set in accordance with the peak position of the signal detected in each scanning operation. In addition, the second structural example can maintain the binary value-determining level by setting the mode switching signal from the external circuit to "L".

If the amplitude of the signal caused by stray light exceeds 50% of the amplitude of the desired signal, then the synchronization signal detecting circuit 57B cannot remove the signal components caused by stray light by the operation described above. In such a case, the synchronization signal detecting circuit 57B increases the conversion rate used by the level control section 82 to 70%, 75% or so. By doing so, a signal caused by stray light can be removed.

According to the second structural example, the mode switching signal is kept at "H", and sampling and binary value-determining processing are executed for each scan in this state. Like the first structural example, the second structural example can set a binary value-determining level for each scanning operation.

In general, it is hard to think that the optical efficiency of the laser optical unit deteriorates each time a scanning operation is executed. However, condensation or dust may give rise to a sudden deterioration in the optical efficiency. For this reason, a binary value-determining level is set or determined when a copy button or another button for starting an image forming operation is depressed. With this feature, even if the optical efficiency suddenly deteriorates by reason of condensation or dust, a signal caused by stray light can be removed, and stable image forming processing can be executed.

To cope with the deterioration the optical efficiency may suffer with time, the setting of the binary value-determining level may be executed only when the digital copying machine (image forming apparatus) is switched on. In this case, it is possible to efficiently cope with the deterioration the optical efficiency may suffer with time where the image forming apparatus is used for a long time.

A description will be given of the third example of a synchronization signal detector 57C.

Figure 14:
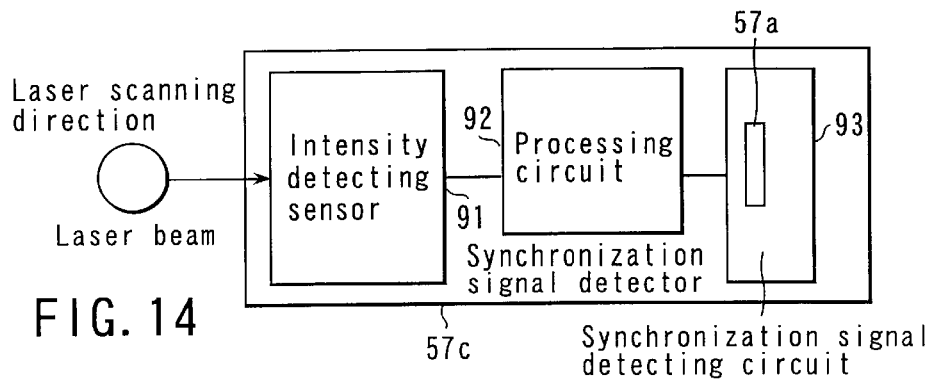
FIG. 14 shows a structural example (third structural example) of a synchronization signal detector which has an intensity-detecting sensor and a synchronization signal-detecting sensor and which controls the binary value-determining level of the synchronization signal-detecting sensor by use of the intensity-detecting sensor.

FIG. 14 shows a circuit diagram illustrating the third structural example of the synchronization signal detector 57C.

The synchronization signal detector 57C comprises a light intensity detecting sensor (light intensity detector) 91, a processing circuit 92 and a synchronization signal detecting circuit 93. The light intensity detecting sensor 91 is a photoelectric conversion element (e.g., a photodiode) for detecting the intensity of light coming from a semiconductor laser 51. The photoelectric conversion element converts the energy (intensity) of detected light into electric signals. On the basis of an output signal from the light intensity detecting sensor 91, the processing circuit 92 determines a binary value-determining level Vref to be used by the synchronization signal detecting circuit 93. In this manner, the synchronization signal detecting circuit 93 has its binary value-determining level Vref set by the processing circuit 92. The circuit configuration of the synchronization signal detecting circuit 93 is similar to that of the synchronization detector 57A, and includes a photodiode 57a.

Figure 15:
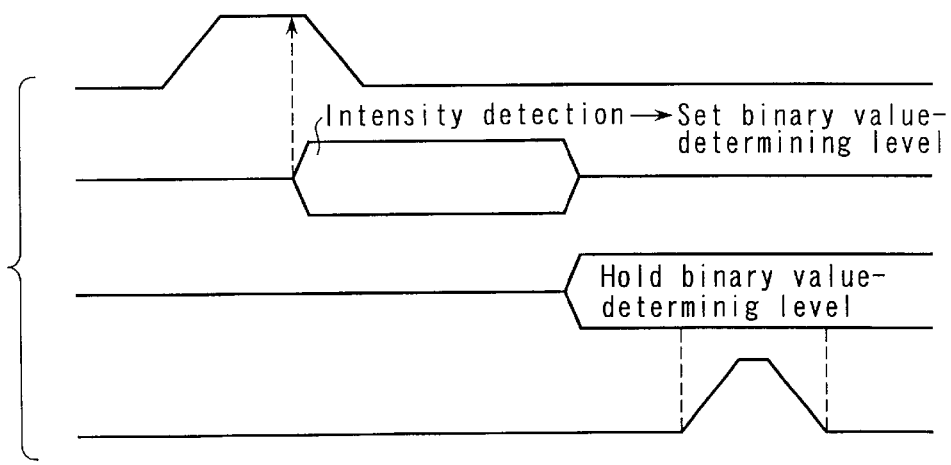
FIG. 15 is a timing chart illustrating how the synchronization signal detector depicted in FIG. 14 operates.

FIG. 15 is a timing chart illustrating how the synchronization signal detector 57C depicted in FIG. 14 operates. Reference will be made to the case where the synchronization signal detector 57C is employed in the laser optical system unit 15 shown in FIGS. 2, 3 or 4.

A front beam emitted from the laser diode 51a of the semiconductor laser 51 passes through the condenser lens 52 and is reflected by the polygon mirror 53, which is a rotatable multi-face mirror. The polygon mirror 53 is rotated at a constant speed by a polygon motor 62, which in turn is driven by a polygon motor driver 61. The reflected light from the polygon mirror 53 passes via the Fθ lens 54, is reflected by the first return mirror 55, and is then incident on the exposure position X of the photosensitive drum 17, i.e. the image bearer. As a result, an electrostatic latent image is formed on the photosensitive drum 17.

Part of the light signal passing through the Fθ lens 54 is reflected by the second return mirror 56, thereby obtaining the laser beam shown in FIG. 14. This laser beam is first incident on the intensity detecting sensor 91 of the synchronization signal detector 57C. The photoelectric conversion element of the intensity detecting sensor 91 converts the incident laser beam into an electric signal, which represents the light intensity of the laser beam. The electric signal, representing the intensity of the laser beam, is supplied to the processing circuit 92. The processing circuit determines a binary value-determining level Vref to be used by the succeeding synchronization signal detecting circuit 93 on the basis of a detection result obtained by the intensity detecting sensor. It should be noted that this processing circuit is an electric circuit and therefore does not have a photoelectric conversion function.

When the laser beam is incident on the synchronization signal detecting circuit 93, the photodiode 57a of the synchronization signal detecting circuit 93 converts the laser beam into an electric signal, which represents the light intensity of the laser beam. The synchronization signal detecting circuit 93 generates a synchronization signal based on the comparison the comparator COM makes between the signal obtained by the photodiode 57a and the binary value-determining level Vref set by the processing circuit 92. The processing circuit 92 maintains the binary value-determining level Vref set by the above processing until output of the digitized synchronization signal ends.

Since the binary value-determining level Vref is set by the above processing, the processing circuit incorporating a CPU etc. need not be an external circuit, and yet the binary value-determining level Vref can be set in accordance with the intensity of the laser beam.

The binary value-determining level Vref set by both the intensity detecting sensor 91 and the processing circuit 92 is updated during each scanning time. Hence, the binary value-determining level Vref is automatically updated for each scanning operation.

The binary value-determining level Vref may be maintained until the end of the copying operation. By so doing, the binary value-determining level Vref is updated for each copying operation.

The processing described above may be executed immediately after the operation of turning on the image forming apparatus, with the binary value-determining level Vref being maintained until the power-off time. In this case, the binary value-determining level Vref is updated each time the power supply is turned on.

As described above, the synchronization signal detector of each example sets a binary value-determining level in accordance with the optical intensity of the semiconductor laser and operates in such a manner as to optimize a synchronizing signal output from the synchronization signal detecting signal. With this feature, the signal component caused by stray light and output from the synchronization signal detector can be eliminated. Moreover, the measures for solving the problems of stray light do not entail an increase in the number of assembling steps or an increase in the cost needed for the structural components, and yet synchronization error due to stray light is prevented.

Even when the optical output of the semiconductor laser is increased in accordance with the sensitivity deterioration of the photosensitive drum, the synchronization detector of each structural example operates, with the increase in the optical output of the semiconductor laser beam being taken into account, and thus ensures an optimal output at all times. Hence, the present invention can provide a laser optical system unit and an image forming apparatus which reliably prevents a synchronization error even when the optical output of the semiconductor laser is increased to cope with characteristic variations occurring with time.

If a lens, mirror or glass member is stained, and the optical efficiency thereof deteriorates, the intensity of the light reaching the synchronization signal detector will decline. Even in such a situation, the synchronization signal detector of each structural example operates in such a manner that the binary value-determining level is optimized in accordance with the intensity of incident light. It is therefore possible to possible to provide a laser optical system unit and an image forming apparatus that reliably prevent erroneous detection of a synchronization signal and ensure detection of a synchronization signal even if optical members are stained markedly.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A light beam scanning apparatus for scanning a light beam across an image bearer on which a latent image is formed, said light beam scanning apparatus comprising:
   a light emitter for emitting a light beam in accordance with the latent image to be formed on the image bearer;
   an optical system for guiding the light beam emitted by the light emitter to the image bearer and for scanning the light beam across the image bearer in a main scanning direction thereof one line at a time, based on a synchronization signal; and
   a synchronization signal detector for detecting a synchronization signal, said synchronization signal detector including a photoelectric conversion element that detects the light beam scanned by the optical system in units of one cycle and converts the detected light beam into an analog signal,
   said synchronization signal detector digitizing the analog signal obtained by the photoelectric conversion element based on a reference signal supplied from an external circuit, and thereby obtaining a digital signal that serves as the synchronization signal,
   wherein
   said image bearer rotates at a predetermined outer peripheral speed of a predetermined value; and
   said synchronization signal detector performs digitizing processing based on said reference signal supplied from the external circuit in accordance with an accumulative number of rotations the image bearer makes.

2. An image forming apparatus having an image bearer on which a latent image is formed by irradiation of a light bean, said image forming apparatus comprising:
   a light beam scanning apparatus for radiating a light beam onto the image bearer based on image information;
   a developing unit for developing the latent image the light beam scanning apparatus forms on the image bearer;
   a transfer section for transferring the image developed by the developing unit onto an image formation medium; and
   a controller for controlling the light beam scanning apparatus to form the latent image, controlling the developing unit to develop the latent image, and controlling the transfer section to transfer the developed image onto the image formation medium,
   said light beam scanning apparatus including:
      a light emitter for emitting a light beam, with which to form the latent image, to the image bearer;
      an optical system for guiding the light beam emitted by the light emitter to the image bearer and for scanning the light beam in the main scanning direction of the image bearer one line at a time based on a synchronization signal; and
      a synchronization signal detector for detecting said synchronization signal, said synchronization signal detector including a photoelectric conversion element that detects the light beam scanned by the optical system in units of one cycle and converts the detected light beam into an analog signal, the synchronization signal detector digitizing the analog signal obtained by the photoelectric conversion element on the basis of a reference signal supplied from the controller, so as to obtain a digital signal that serves as said synchronization signal,
   wherein said controller rotates the image bearer at a predetermined outer peripheral speed and determines the reference signal for the synchronization signal detector in accordance with an accumulative number of rotations the image bearer makes.

3. An image forming apparatus having an image bearer on which a latent image is formed by irradiation of a light beam, said image forming apparatus comprising:
   a light beam scanning apparatus which irradiates a light beam onto the image bearer based on image information;

a developing unit which develops an image on the image bearer on which the latent image is formed by the light beam scanning apparatus;

a transfer section which transfers the image developed by the developing unit onto an image formation medium; and a controller which controls the light beam scanning apparatus to form the latent image on the image bearer, controls the developing unit to develop the latent image, and controls the transfer section to transfer the developed image onto the image formation medium, said light beam scanning apparatus including:
- a light emitter which emits a light beam in accordance with the latent image formed on the image bearer;
- an optical system which scans the light beam emitted by the light emitter across the image bearer in a main scanning direction thereof one line at a time, based on a synchronization signal;
- a mirror formed of a multiple-layer structure of a reflector and glass, said reflector receiving and reflecting the light beam; and
- a synchronization signal detector which detects the synchronization signal, said synchronization signal detector including:
  - a peak detector section which detects the peak intensity of the light beam, wherein said peak detector section operates based on a driving signal supplied from the controller, and stops operating when supply of the driving signal is stopped;
  - a processing circuit which determines a reference signal in accordance with the peak intensity of the light beam detected by the peak detector section, wherein said processing circuit holds the reference signal when supply of the driving signal from the controller is stopped; and
  - a photoelectric conversion element which detects the light beam reflected by the mirror in units of one cycle and converts the light beam into an analog signal, said synchronization signal detector digitizing the analog signal obtained by the photoelectric conversion element in accordance with a mode switching signal supplied from the controller, and thereby obtaining a digital signal which serves as the synchronization signal.

* * * * *